March 9, 1965 R. J. HABER ETAL 3,172,626
PROGRAMMING CONTROL FOR ROTARY HYDRAULIC ARREST GEAR
Filed June 10, 1964 2 Sheets-Sheet 1

INVENTORS
Robert J. Haber
Harry E. Mayhew, Jr.
Meredith C. Wardle
& William R. Schlegel
BY Birch and O'Brien
ATTORNEYS

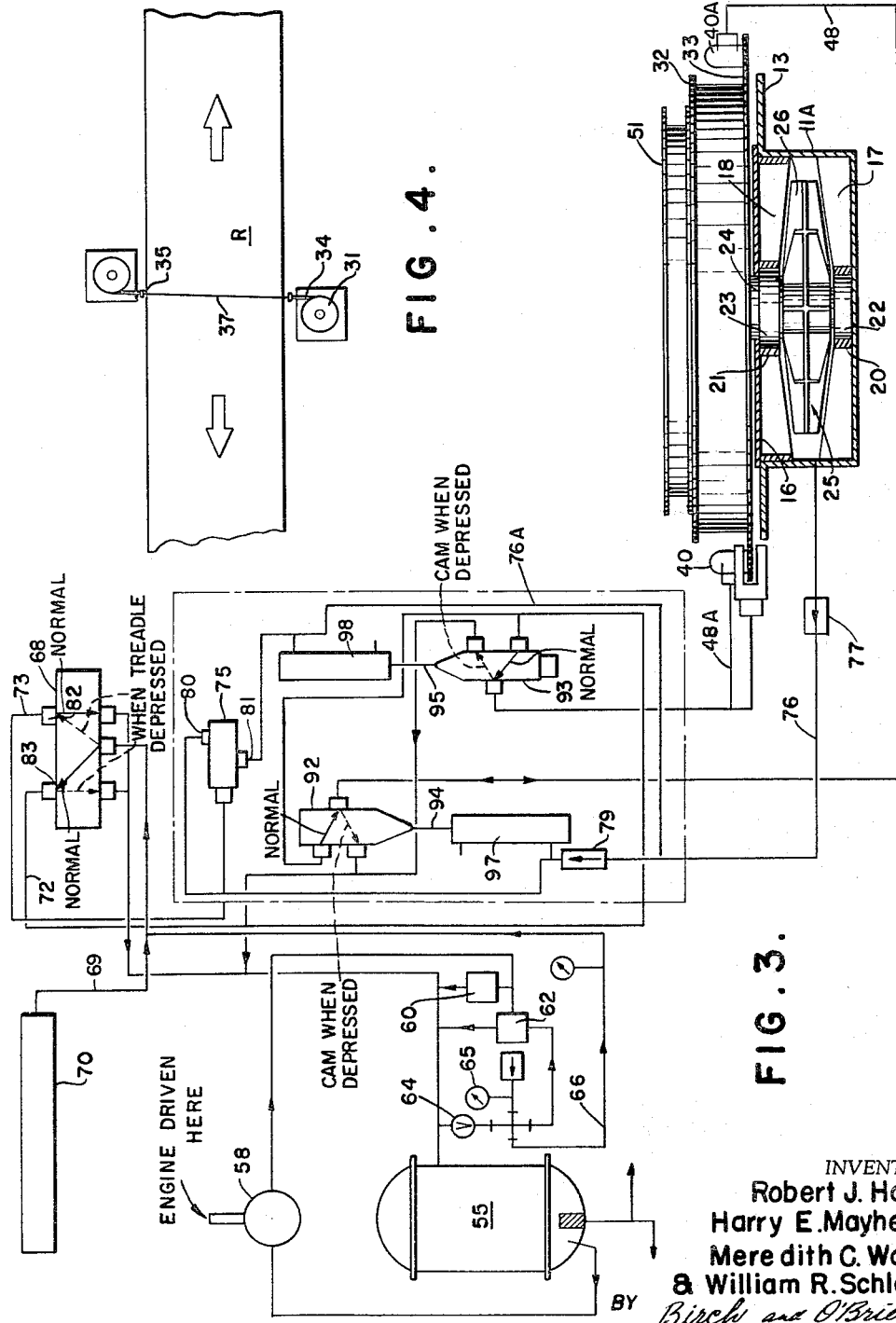

United States Patent Office 3,172,626
Patented Mar. 9, 1965

3,172,626
PROGRAMMING CONTROL FOR ROTARY
HYDRAULIC ARREST GEAR
Robert J. Haber and Harry E. Mayhew, Jr., Wilmington, Del., Meredith C. Wardle, Chadds Ford, Pa., and William R. Schlegel, Wilmington, Del., assignors to All American Engineering Company, Wilmington, Del., a corporation of Delaware
Filed June 10, 1964, Ser. No. 374,128
3 Claims. (Cl. 244—110)

The present invention relates to arresting gear primarily for aircraft wherein a transverse deck or runway pendant for aircraft arrest hook engagement is harnessed to one or more arrest engines which are positioned adjacent the deck or runway.

This particular invention is used in conjunction with frictionless rotary hydraulic arrest engines generally comprised of a rotatable line or tape storage drum, a purchase line or tape of nylon wrapped in a single coil around the storage drum, a rotatable wheel with radial paddles in a liquid filled housing, and a paddle wheel shaft extending from the interior of the housing through bearing means in the top of the housing to which the rotatable storage drum is keyed.

With this form of rotary arresting apparatus there usually are no friction brakes or valves used and the programming of runout during arrest of an engaging aircraft to be decelerated to an arrest runout position on the runway is accomplished by the unwinding of the single lapped coil of purchase material from the storage drum as its radial position of payout decreases during runout. Such a system is highly efficient and operates very satisfactorily without exterior means to program the runout during an arrest.

The present novel system relates to a hydraulic friction brake control arrangement responsive to the arrest engine liquid pressure in the liquid housing thereof in addition to the normal programming characteristics of payout from the storage drum of the foregoing described hydraulic rotary arresting apparatus.

One of the problems in aircraft arresting gears is to efficiently program the arresting forces so that the maximum allowable working load is quickly reached and then not exceeded during the remainder of the runout, dropping rapidly at the end so that the stroke runout length is efficiently used.

Accordingly, an object is to provide an apparatus and method for proper braking during the first portion of runout, a preset pressure responsive system for complete off braking cutout after a predetermined pressure is built up during the first portion of runout and then providing for reapplication of a predetermined braking effect for the remainder of the runout to the completed arrest runout position of an engaged aircraft.

Another object is to provide novel means to vary the pressure available to the brakes, whereby the maximum retardation force can be changed in value according to preset values.

Another object is to provide novel means for a complete brake release after final runout following each arrest, whereby suitable retrieve means may be used to quickly rewind the arrest apparatus with an after retrieve reapplication of the brakes for the first portion of runout of the next arrest operation.

A further object is to provide a novel separate outside source braking system for rotary hydraulic arresting engines by applying a braking action during arrest to a selected rotating brake flange portion of the arrest engine.

Yet another object is to provide in combination a system of program control for a rotary hydraulic arrest engine consisting of an outside pressure source and an engine housing pressure sensing arrangement in connection with the outside pressure source.

The above and other objects and advantages of the present invention will appear more fully hereinafter from a consideration of the detailed description which follows, taken with the accompanying drawings wherein several features and embodiments thereof are illustrated. It is to be expressly understood, however, that the drawings are for the purpose of illustration only and are not intended as a definition of the limits of the invention.

In the drawings, wherein like reference characters refer to like parts throughout the several views:

FIGURE 3 is a schematic view of a second embodiment of the apparatus using a combined internal and outside source hydraulic system for programmed operation of the brake;

Figure 5:
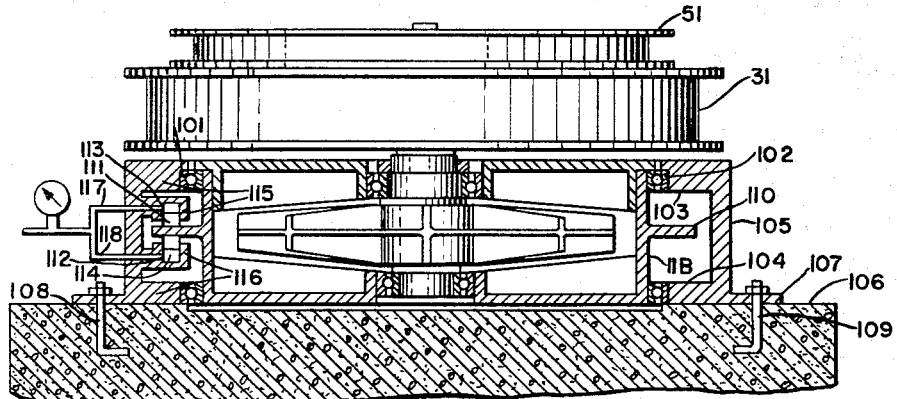

FIGURE 4 is a top plan semi-schematic view of a runway, a transverse runway pendant and spaced rotary hydraulic arrest engines on each side of the runway to which the present novel programmed brake system is applied; and FIGURE 5 is a third embodiment of this invention wherein the liquid housing of the arrest engine is rotatable and is formed with a brake disk and an outer hoop in which the housing is journalled and which provides for mounting the brake shoes of a hydraulic friction brake means.

Figure 1:
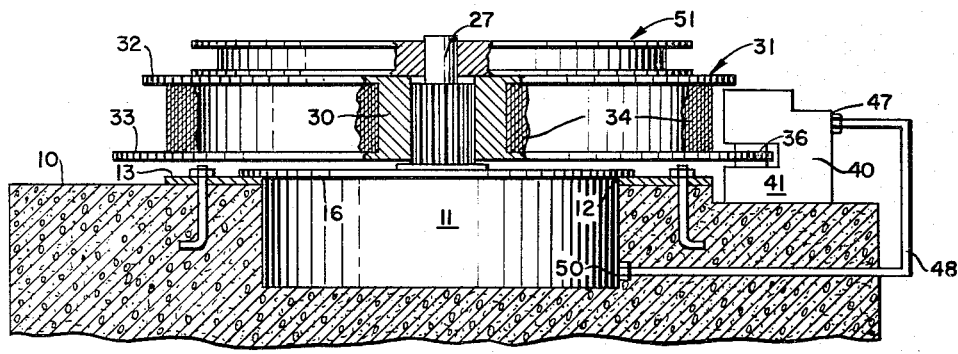
FIGURE 1 is a part cross section view and side elevation view of the purchase cable or tape drum of a hydraulic arrester engine, showing the lower annular flange of the drum extended to provide a brake flange for the shoes or pucks of a hydraulically actuated friction brake with a suitable sprocket power retrieve means.

Referring in detail to the drawings and first with particular reference to FIGURE 1 of embodiment one, the same comprises a support for the arrest engine, such as an anchor pad 10 recessed to receive a liquid housing 11. The anchor pad may be concrete or solid earth. The housing 11 is formed like a large tub open at the top with its rim 12 flush with the surface of the anchor pad around the perimeter of the tub recess and with an annular centrally open anchor plate 13. The anchor plate 13 is anchored by a suitable concrete or earth anchor and a housing cover 16 formed with a central opening seats and seals over the top rim of the housing 11.

The bottom wall of the housing is formed with radial stator vanes 17 which are vertically spaced from radial stator vanes 18 formed on the interior of the cover 16, see FIGURE 3. Also, the housing encloses vertically spaced centrally positioned rotor shaft bearings 20 and 21 to journal vertically spaced bearing portions 22 and 23 of a rotor or paddle wheel shaft 24 therein. The shaft 24 carries a rotor wheel 25 with radial blades 26 extending between the stator vanes and the shaft 24 extends upward above the housing cover 16 into a splined hub portion and terminates with a reduced bearing section 27, see FIG-URE 1.

The splined hub 28 is arranged to receive cooperating internal splines in the hub 30 of a tape storage drum 31, which drum includes vertically spaced flanges 32 and 33, respectively, between which, for example, is wound a coil of tape 34, preferably nylon tape of suitable form.

The nylon tape 34 is normally coiled around the storage drum 31 and the free end of the tape has a suitable coupling means 35, which permits the same to be coupled to an end of a runway cross cable or deck pendant 37 extending across a runway R, see FIGURE 4. The deck pendant couples in a similar manner at the opposite end to the free end of the purchase tape 34 of a second arrest engine positioned on the opposite side of the runway R.

Figure 2:
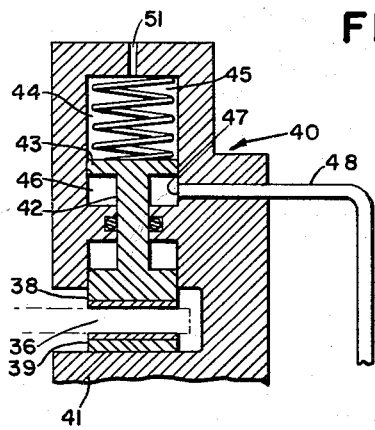
FIGURE 2 is a detail cross section view of the brake in FIGURE 1.

The lower flange 33 of the tape storage drums 31 of each arrest engine is larger in circumference than the upper flange 32 in the provision of a brake disk 36 and extends between friction brake members, such as brake pucks or shoes 38 and 39 of a hydraulic brake housing 40, see FIGURES 1 and 2. The brake housing may comprise a U-shaped formation with a lower support 41 for brake shoe 39 and a cylinder 42 for a piston 43, which supports the brake shoe 38. Above the cylinder 42 is a spring chamber 44 with a coil spring 45. The piston 43, as shown, is spool-shaped with an upper head 46 engaged by the lower part of the spring 45 on the top surface and the cylinder 42 below the piston head 46 is formed with an outlet port 47, which connects with a hydraulic line 48 to a port 50 in the side wall of the liquid housing 11. The top of the cylinder 42 above the spring 45 is formed with an air relief opening 51.

Normally the spring 45 holds the brake shoes or pucks 38-39 engaged with the brake disk 36, whereby the runway pendant 37 is held taut and under tension, until engaged by an aircraft during an arrest. After aircraft pendant engagement and as pendant runout progresses in either direction on the runway R during an arrest, a pressure is built up within the arrest engine liquid housing 11 by the rotating of the rotor wheel 25 and housing pressure is imparted through the hydraulic line 48 and into the cylinder 42 below the piston head 46. This hydraulic pressure in line 48 causes the piston 42 to rise and compress the spring 45 and gradually release the brakes to an off position. When the pressure in the cylinder 46 reduces toward end of runout, the spring 45 again forces the piston 43 downward so the brake pucks or shoes frictionally engage the brake disk 36 on the storage drum flange 33, thereby decelerating the rotation of the storage drum 31.

Thus there is provided with this embodiment an internal pressure source for programming a friction hydraulic brake arrangement from an initial pretension brake "on" position to a brake "off" position during runout and thence to a storage drum decelerating brake "on" position toward the end of runout. Suitable means may be provided to release the brake for retrieve operation, that is to rewind the storage drum after an arrest performance, said retrieve mechanism being partly shown in FIGURES 1 and 3 by numeral 51.

A second embodiment of friction hydraulic brake control may be provided by utilizing an outside pressure source brake control system, see the diagrammatic view of FIGURE 3, in combination with the internal pressure source of brake control. This system includes the same arrest engine and brake unit as in embodiment one, but this system may have several brake means and provides means for first having a desired number of a plurality of brakes applied during the first portion of runout during aircraft arrest, a second all brakes off after a preset pressure is reached and then third having a desired number of brakes reapplied for the remainder of the runout to complete the arrest.

All brakes may then be manually released for retrieve of the extended tape 34 and deck pendant 37 after termination of each arrest runout and reapplied prior to the next operation of the arresting engines.

The system of embodiment two, see FIGURE 3, generally consists of a reservoir 55, a suitable motor for operating a brake system pump 58, a safety relief valve 60 for the system pressure, for example, it may be set for 50 p.s.i. above operating pressure and an unloading valve 62 for maintaining a selected brake operating pressure. Also, a manual pressure relief valve 64 is provided in the system and the pressure in the system is correctly indicated by any suitable pressure gauge 65 in a pressure line 66 to a foot treadle controlled valve 68 connected by hydraulic line 69 from an accumulator 70 and by line 73 to an on-off pilot valve 75; in addition line 72 connects to cam operated 3-way valves 93 and 92. Line 72 normally provides hydraulic pressure to brake 40 from lines 48 and 48A through valves 92 and 93. Also water pressure line 76 through a filter 77 and one-way valve 79 connects to cylinder 97 and then to port 80 on pilot valve 75 and line 76 also connects through 76A to cylinder 98 and then to port 81 on valve 75.

When the arrest engine is at rest and the operator has not depressed foot treadle on valve 68, hydraulic pressure flows through line 66 through valve 68 to line 72 through valves 93 and 92 to lines 48A and 48 and applies brakes 40 and 40A.

During the first second of arrestment water pressure in tub 11 enters cylinders 97 and 98 and depresses the piston against spindle in valves 92 and 93 and releases hydraulic pressure from brakes 40 and 40A and dumps hydraulic fluid back to reservoir 55. As the water pressure is reduced near the end of runout in tub 11 the spring (not shown) in cylinder 98 returns piston to original position and again places hydraulic pressure on brake 40 by returning valve 93 to original position. Water pressure in cylinder 97 is held by check valve 79 and brake 40A remains disengaged.

Movement of foot treadle on valve 68 admits hydraulic pressure to port 73 and opens valve 75 allowing water pressure in cylinder 97 to bleed back through 76A to 76, through filter 77 and thus to tub 11. Simultaneously valve 92 returns to normal position, caused by spring in 97 (cylinder) pushing pistons back. The foot treadle also opens port 83 to a return line to reservoir and bleeds hydraulic pressure in line 72 thus releasing brakes for retraction. At the end of retraction and after pretensioning release of the foot treadle again allows hydraulic pressure to reach brakes and resets system for next arrest.

The foot valve ports 82 and 83 may be opened simultaneously by a suitable foot treadle, not shown. The port 82 in the foot valve 68 permits pressure to pass to the pilot valve 75 and the pilot valve opens and releases the brake 40A. The port 83 when opened by the foot treadle of the foot valve 68 releases the pressure to valves 92 and 93, which are operated by valve actuator cam means, not shown. These valves 92 and 93 connect by shafts 94 and 95 to brake control cylinders 97 and 98 which have suitable piston means therein responsive to pressure.

These cylinders 97 and 98 each include coil springs therein, not shown, and may be preset to control the piston movements therein and thus regulate the time of braking action.

*Operation embodiment two*

In operation of the brakes of the hydraulic system in combination with an outside pressure source, pressure is generated in the arrest engine housing 11A due to the rotating paddle wheel 25 therein. This pressure causes transfer through hydraulic lines 48 and 76 of housing pressure to the brake control cylinders 97 and 98 of respective brakes 40 and 40A and the pistons in these cylinders are raised against the preset springs therein to cause the piston shafts 94 and 95 to extend and actuate cam means, not shown, to actuate the cam operated valves 92 and 93, thereby permitting outside pressure source system pressure in lines 48 and 48A to be imparted to the respective housings of the brakes 40 and 40A, thereby relieving pressure.

When the pressure in the arrest engine housing 11A reduces toward the end of runout, the brake control cylinder spring in cylinder 98 returns the shaft 95 to the retracted position, this allows the cam operated valve 93 to open and the brake 40A is applied by the spring. However, since brake cylinder 98 is between the check valve 79 and the pilot valve 75, brake 40 remains off and brake 40A may be released by depressing the foot treadle of foot valve 68. Then upon release of the treadle operated valve 68, the system pressure is again applied to the brakes 40 and 40A.

To release the brakes at any time, it is only necessary to manually operate the treadle of the foot valve. During treadle operated brake release, the retrieve operation may be instituted to rewind the storage drum and prepare the arrest engine for the next arrest operation.

*Third embodiment*

A third embodiment of this invention is illustrated in FIGURE 5 wherein the rotary hydraulic arresting engine is modified to the extent that liquid housing 11B itself is rotatable. Thus the housing is mounted by means of radial bearings 101 and 102 mounted in annular vertically spaced flanges 103 and 104 of a stationary annular ring 105.

The ring 105 is mounted on a base 106 by means of a base lug 107 and suitable base anchors 108 and 109.

The arresting engine liquid housing 11B has a midriff brake flange 110 fixed to the exterior side wall thereof. This brake flange has one or more sets of brake shoes 111 and 112 riding on the same, which brake shoes may be set by adjusting the pressure source prior to operation of the arresting engine to provide any predetermined slipping load.

With this braking arrangement if the torque load in the liquid housing 11B of the arrest engine exceeds the brake torque setting the engine liquid housing assembly rotates within the fixed annular ring 105 on bearings 101 and 102, until torque load has dropped below that of the brake shoe engaging slipping torque.

Thus overloads in the tape payout from the tape storage drum 31 are eliminated and the deceleration curve during runout is restricted so as not to exceed a maximum value. The brake pucks or shoes 111 and 112 of the brake means are mounted to reciprocate in vertically spaced cylinders on each side of the brake flange 110. These cylinders are each provided with ports 113 and 114 positioned adjacent each end of the cylinders 116, which ports connect with hydraulic lines 117 and 118 to a pressure source by line 115. This may be an outside pressure source similar to the outside source illustrated in FIGURE 3 in connection with embodiment two and accordingly with this embodiment the brakes may be treadle controlled for "on" and "off" operation during runout and at the end of runout when it is desired to retrieve the payout of tape and deck pendant to prepare for the next arrest operation.

By mounting the complete hydraulic arrester to rotate within an outer fixed ring or hoop, arresting loads can be programmed through the application of the exterior hydraulic friction brake means engageable with each side of the mid-riff brake flange on the exterior side of the liquid filled housing of the arrest engine. Thus this embodiment may serve to limit the maximum load produced by the system by the device of limiting the torque that is available to the drum and tape system from the reactive torque supplied by the housing and its anchoring means.

Referring to FIGURE 5, the braking control is as follows:

From any available source of pressure at line opening 115 and controlled to provide a constant, reliable value of p.s.i., the brakes 111 are sized or applied to provide only the braking force required for the limit torque desired for any reactive torque developed, applied to the brake flange or disc 110. At a higher force imposed on the brake disc by the stator and housing hydraulic torque exchange, slipping will occur and prevent a higher torque from being reacted by the case mounting attachments 108 and 109.

Without further description it is believed that the advantages of the present invention over the prior art are apparent and while only three embodiments of the same are illustrated, it is to be expressly understood that the invention is not limited thereto as various changes may be made in the combination and arrangement of the parts illustrated, as will now likely appear to others and those skilled in art. For a definition of the scope or limits of the invention, reference should be had to the appended claims.

What is claimed is:

1. In a hydraulic rotary arresting engine having a tape storage drum with a hub, a liquid housing, vertically spaced bearings mounted centrally of the housing, a vertical rotor shaft journalled in the vertically spaced housing mounted bearings extending above the top of the housing for connection to said storage drum hub, a brake means for said engine, said drum having an annular flange with a brake disk, said brake control means including a brake housing adjacent said disk, said brake housing having a cylinder, a coil spring in the upper portion of said cylinder, a piston having an upper side and a lower side, said upper side being on the lower portion of said cylinder below the coil spring, said upper side of the piston being engaged by the lower part of said spring, said spring biasing said piston downwardly toward said brake disk, a brake shoe carried by the lower side of said piston engageable with said disk by the said spring, and a hydraulic line between the lower portion of said cylinder and the said liquid housing for pressurizing said cylinder below the lower side of said piston in response to pressure developed in said liquid housing during operation of said rotary arresting engine to thereby compress said spring and raise said brake shoe from said disk to release said brake means.

2. A friction brake system for rotary hydraulic arresting gear having a tape wound storage drum, the free end of said tape being connected to a cross runway cable, a liquid filled rotor housing, a rotor wheel on a rotor shaft journalled to rotate in the said housing, said rotor wheel shaft having an extended splined portion exterior of the housing, said drum being mounted on said splined portion of said rotor shaft, said housing being rotatable in said fixed ring, said ring being mounted on a supporting pad, an annular brake flange projecting from the mid-riff of said housing, brake means mounted adjacent to said brake flange, and a hydraulic pressure source connected to said brake set by adjusting the pressure source, said brake being a predetermined braking force during rotation of said rotor wheel in the housing, whereby the maximum load produced by said system is relieved from reactive torque from said rotatable housing and any suitable anchoring means for mounting said fixed ring in which said housing rotates.

3. A rotary hydraulic arresting gear for aircraft having a tape wound storage drum, the free end of said tape being connected to a cross runway cable for aircraft arrest hook engagement, a liquid filled housing, an annular support in which said housing is rotatably journalled, runway anchor means for said annular support, said housing having an annular brake disk around the housing, a rotor wheel on a rotor shaft, said shaft being journalled to rotate in said rotatable housing, said shaft having an extended portion exterior of the housing, said drum being mounted on said extended portion to rotate with said shaft, and brake means engaging said brake disk with predetermined braking force, whereby a force imposed on the rotor through the liquid in said housing and resulting hydraulic exchange provides slipping braking force between said brakes and said brake disk, to thereby prevent a higher torque from being reacted at said runway anchor means for said annular support.

References Cited by the Examiner
UNITED STATES PATENTS

| | | | |
|---|---|---|---|
| 2,843,228 | 7/58 | Wysor | 244—110 |
| 2,977,076 | 3/61 | Byrne et al. | 244—110 |
| 2,987,278 | 6/61 | Hoffman et al. | 244—110 |
| 3,139,249 | 6/64 | Trifillis | 244—110 |

FERGUS S. MIDDLETON, *Primary Examiner.*
MILTON BUCHLER, *Examiner.*